United States Patent
Liu et al.

(10) Patent No.: US 10,715,044 B1
(45) Date of Patent: Jul. 14, 2020

(54) SINGLE STAGE MULTI-OUTPUTS CIRCUIT AND A METHOD THEREOF

(71) Applicant: Chengdu Monolithic Power Systems Co., Ltd., Chengdu (CN)

(72) Inventors: Bairen Liu, Chengdu (CN); Shufa Jiang, Chengdu (CN); Bo Yu, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/697,088

(22) Filed: Nov. 26, 2019

(30) Foreign Application Priority Data

Dec. 12, 2018 (CN) .......................... 2018 1 1515117

(51) Int. Cl.
| | |
|---|---|
| *H05B 37/02* | (2006.01) |
| *G05F 1/00* | (2006.01) |
| *H02M 3/24* | (2006.01) |
| *H05B 45/44* | (2020.01) |
| *H02M 1/00* | (2006.01) |
| *H05B 45/382* | (2020.01) |

(52) U.S. Cl.
CPC .............. *H02M 3/24* (2013.01); *H02M 1/00* (2013.01); *H05B 45/382* (2020.01); *H05B 45/44* (2020.01); *H02M 2001/009* (2013.01)

(58) Field of Classification Search
CPC .... H05B 41/34; H05B 33/0803; H05B 41/28; H05B 33/0809; H05B 41/2827; H05B 41/3925; H05B 33/0815; H05B 33/0818; H05B 41/3927; H05B 37/029; H05B 33/0851; H05B 41/282; H05B 39/09; H05B 41/2828; H05B 41/3921; H05B 33/0827; H05B 37/0254; H05B 37/02; H05B 41/042; H05B 41/2822; H05B 41/295; Y02B 20/202; H01F 38/10
See application file for complete search history.

(56) References Cited

U.S. PATENT DOCUMENTS

| | | | |
|---|---|---|---|
| 9,215,769 B2 | 12/2015 | Ren et al. | |
| 9,485,819 B2 | 11/2016 | Liu et al. | |
| 9,661,700 B2 | 5/2017 | Kuang et al. | |
| 9,913,332 B2 | 3/2018 | Kuang et al. | |
| 9,998,005 B2 | 6/2018 | Liu et al. | |
| 10,021,754 B2 | 7/2018 | Kuang et al. | |
| 10,091,846 B2 | 10/2018 | Liu | |
| 2014/0085945 A1* | 3/2014 | Kuang | G05F 1/563 363/46 |
| 2018/0178710 A1* | 6/2018 | Ichikawa | H05B 45/37 |

* cited by examiner

*Primary Examiner* — Minh D A
(74) *Attorney, Agent, or Firm* — Perkins Coie LLP

(57) ABSTRACT

A control circuit of a power converter providing at least a first output voltage and a second output voltage, having: a first loop control circuit, configured to provide a first error amplifying signal based on the first output voltage and a first reference voltage; a second loop control circuit, configured to provide a second error amplifying signal based on the second output voltage and a second reference voltage; a saturation detecting circuit, configured to provide a saturation indicating signal based on the first error amplifying signal and a saturation reference signal; and a first current source circuit, configured to charge an output terminal of the second error amplifier based on the saturation indicating signal.

17 Claims, 6 Drawing Sheets

SINGLE STAGE MULTI-OUTPUTS CIRCUIT AND A METHOD THEREOF

CROSS-REFERENCE TO RELATED APPLICATIONS

This application claims priority to and the benefit of Chinese Patent Application No. 201811515117.8, filed on Dec. 12, 2018, which is incorporated herein by reference in its entirety.

FIELD

The present invention relates generally to electronic circuits, and more particularly but not exclusively to switching mode power supplies.

BACKGROUND

Today, LED backlighting is more and more widely adopted by monitors. For example, in LCD TV field, LED is tending to replace traditional CCFL as the backlighting source. In some applications, besides currents provided to LED strings, voltages are also provided to the other circuits or chips inside the whole system, e.g., MCU by a LED driver. A driver in these applications often adopts single power stage multiple outputs topology, to provide multiple outputs, e.g., currents to the LED strings and voltages to the other circuits.

In a single power stage multiple outputs topology, one of the outputs is in a feedback loop to control the power conversion of the single power stage. Compared with other output regulation loops, the feedback loop with power conversion control is slow, especially when any one of the other outputs suffers a sudden load change, the feedback loop with power conversion control may need a long time to respond, which results in a slow load regulation. In other words, the dynamic response of the driver is poor.

SUMMARY

It is an object of the present invention to provide a cross loop control circuit with fast dynamic response for a single power stage multiple outputs driver.

In accomplishing the above and other objects, there has been provided, in accordance with an embodiment of the present invention, a control circuit of a power converter, wherein the power converter provides a first output voltage and a second output voltage, the control circuit comprising: a first loop control circuit, having a first error amplifier configured to receive the first output voltage and a first reference voltage, and to provide a first error amplifying signal based on a difference between the first output voltage and the first reference voltage; a second loop control circuit, having a second error amplifier configured to receive the second output voltage and a second reference voltage, and to provide a second error amplifying signal based on a difference between the second output voltage and the second reference voltage; a saturation detecting circuit, configured to receive the first error amplifying signal and a saturation reference signal, and to provide a saturation indicating signal based on a comparison result of the first error amplifying signal and the saturation reference signal; and a first current source circuit, having a control terminal configured to receive the saturation indicating signal, and a charging terminal coupled to an output terminal of the second error amplifier, wherein the first current source circuit charges the output terminal of the second error amplifier based on the saturation indicating signal.

In accomplishing the above and other objects, there has been provided, in accordance with an embodiment of the present invention, a control circuit of a power converter, comprising: a first rectifying circuit, configured to provide a first output voltage, wherein the first rectifying circuit has a secondary power switch turned on and off by a secondary power switch control signal to control the first output voltage; a second rectifying circuit, configured to provide a second output voltage; a first loop control circuit, having a first error amplifier configured to receive the first output voltage and a first reference voltage, and to provide a first error amplifying signal based on the first output voltage and the first reference voltage; a second loop control circuit, having a second error amplifier configured to receive the second output voltage and a second reference voltage, and to provide a second error amplifying signal based on the second output voltage and the second reference voltage; a saturation detecting circuit, configured to receive the first error amplifying signal and a saturation reference signal, and to provide a saturation indicating signal based on a comparison result of the first error amplifying signal and the saturation reference signal; and a first current source circuit, having a control terminal configured to receive the saturation indicating signal, and a charging terminal coupled to an output terminal of the second error amplifier, wherein the first current source circuit charges the output terminal of the second error amplifier based on the saturation indicating signal; wherein the secondary power switch control signal is generated based on the first error amplifying signal.

In accomplishing the above and other objects, there has been provided, in accordance with an embodiment of the present invention, a control circuit for a LED driver, wherein the LED driver provides a first output voltage and a second output voltage, and wherein the second output voltage is provided to a plurality of LED strings, the control circuit comprising: a first loop control circuit, having a first error amplifier configured to receive the first output voltage and a first reference voltage, and to provide a first error amplifying signal based on the first output voltage and the first reference voltage; a current balance circuit, coupled to a feedback terminal of a LED string of the plurality of LED strings, and configured to regulate a current flowing through the LED string of the plurality of LED strings; a minimum value selecting circuit, coupled to the feedback terminals of the plurality of LED strings to receive a plurality of feedback voltages of the associated LED strings, and configured to provide a feedback voltage with a minimum value; a second loop control circuit, having a second error amplifier configured to receive the second output voltage and a second reference voltage, and to provide a second error amplifying signal based on the second output voltage and the second reference voltage; a saturation detecting circuit, configured to receive the first error amplifying signal and a saturation reference signal, and to provide a saturation indicating signal based on the first error amplifying signal and the saturation reference signal; and a first current source circuit, having a control terminal configured to receive the saturation indicating signal, and a charging terminal coupled to an output terminal of the second error amplifier, wherein the first current source circuit charges the output terminal of the second error amplifier based on the saturation indicating signal.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
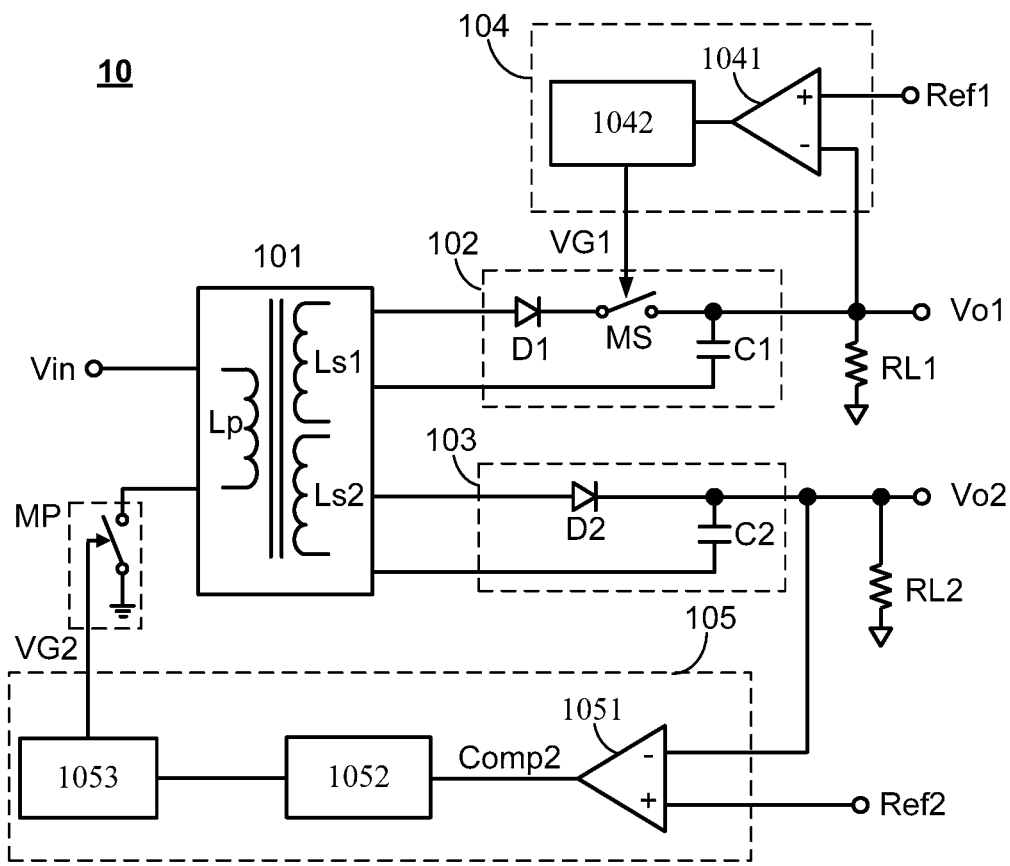
FIG. 1 schematically shows a prior art power converter 10 with single stage and multiple outputs.

FIG. 1 schematically shows a prior art power converter 10 with single power stage and multiple outputs. In FIG. 1, the power converter 10 comprises: a transformer 101, having a primary winding Lp, a first secondary winding Ls1 and a second secondary winding Ls2; a primary power switch MP, coupled to the primary winding Lp of the transformer 101; a first rectifying circuit 102, coupled to the first secondary winding Ls1, and configured to provide a first output voltage Vo1, wherein the first rectifying circuit 102 comprises a secondary power switch MS; a second rectifying circuit 103, coupled to the second secondary winding Ls2, and configured to provide a second output voltage Vo2; a first loop control circuit 104, configured to receive the first output voltage Vo1, and to provide a secondary power switch control signal VG1 to control on and off of the secondary power switch MS; a second loop control circuit 105, configured to receive the second output voltage Vo2, and to provide the primary power switch control signal VG2 to control on and off of the primary power switch MP.

The first rectifying circuit 102 comprises a diode D1, the secondary power switch MS and a capacitor C1 coupled as shown in FIG. 1. The second rectifying circuit 103 comprises a diode D2 and a capacitor C2 coupled as shown in FIG. 1. The diodes D1 and D2 are configured to prevent reverse current from the first output voltage Vo1 to the first secondary winding Ls1, and the reverse current from the second output voltage Vo2 to the second secondary winding Ls2, respectively. The capacitor C1 and C2 are configured to filter the first output voltage Vo1 and the second output voltage Vo2 respectively.

The primary winding Lp of the transformer 101 is configured to receive the input voltage Vin. The input voltage Vin could be a rectified voltage of an AC voltage, or could be a rectified voltage of an AC voltage which has been processed by a PFC circuit. When the primary power switch MP is on, the primary winding Lp stores energy. When the primary power switch MP is off, the energy stored in the primary winding Lp is transferred to the first secondary winding Ls1 or the second secondary winding Ls2 depending on the state of the secondary power switch MS, wherein when the secondary power switch MS is on after the primary power switch MP is off, the energy is transferred from the primary winding Lp to the first secondary winding Ls1, and when the secondary power switch MS keeps off after the primary power switch is off, the energy is transferred from the primary winding Lp to the second secondary winding Ls2. By controlling the on and off of the secondary power switch, the first output voltage Vo1 is built on the capacitor C1 and the second output voltage Vo2 is built on the capacitor C2.

In FIG. 1, the first loop control circuit 104 comprises: a first error amplifier 1041, configured to receive the first output voltage Vo1 and a first reference voltage Ref1, and to provide a first error amplifying signal Comp1 based on the first output voltage Vo1 and the first reference voltage Ref1; a first duty cycle regulating circuit 1042, configured to receive the first error amplifying signal Comp1, and to provide the secondary power switch control signal VG1 based on the first error amplifying signal Comp1.

The second loop control circuit 105 comprises: a second error amplifier 1051, configured to receive the second output voltage Vo2 and a second reference voltage Ref2, and to provide a second error amplifying signal Comp2 based on the second output voltage Vo2 and the second reference voltage Ref2; a second duty cycle regulating circuit 1053, configured to receive the second error amplifying signal Comp2, and to provide the primary power switch control signal VG2 based on the second error amplifying signal Comp2. The second loop control circuit 105 further comprises an isolating circuit 1052, configured to provide the second error amplifying signal Comp2 to the second duty cycle regulating circuit 1053. The isolating circuit 1052 may comprise an opto-coupler.

In FIG. 1, the first loop control circuit 102 controls the first output voltage Vo1 provided to a load RL1 by controlling the secondary power switch MS; the second loop control circuit 105 controls a power from the primary winding Lp to the first secondary winding Ls1 and the second secondary winding Ls2 by controlling the primary power switch MP. When the load RL1 increases suddenly, the first loop control circuit 104 increases on time of the secondary power switch MS to increase the power supplied to the load RL1, which causes the decrease of the power supplied to a load RL2 powered by the second output voltage Vo2. In response, the second loop control circuit 105 regulates the on time of the primary power switch MP, to increase the power transferred from the primary winding Lp to the secondary windings Ls1 and Ls2, and meantime, the duty cycle of the secondary power switch MS is regulated too, to increase the power supplied to the load RL1. As can be learned from the above description, when the load RL1 of the first output voltage Vo1 suddenly changes, the power converter 10 adjusts the power portions between the first loop (controlling the first output voltage Vo1) and the second loop (controlling the second output voltage Vo2), so as to force the second loop control circuit 105 to regulate the power transferred from the primary side. In this way, the whole process needs a long time, which makes the system slow when responses to the load change, i.e., the load transient is poor.

Figure 2:
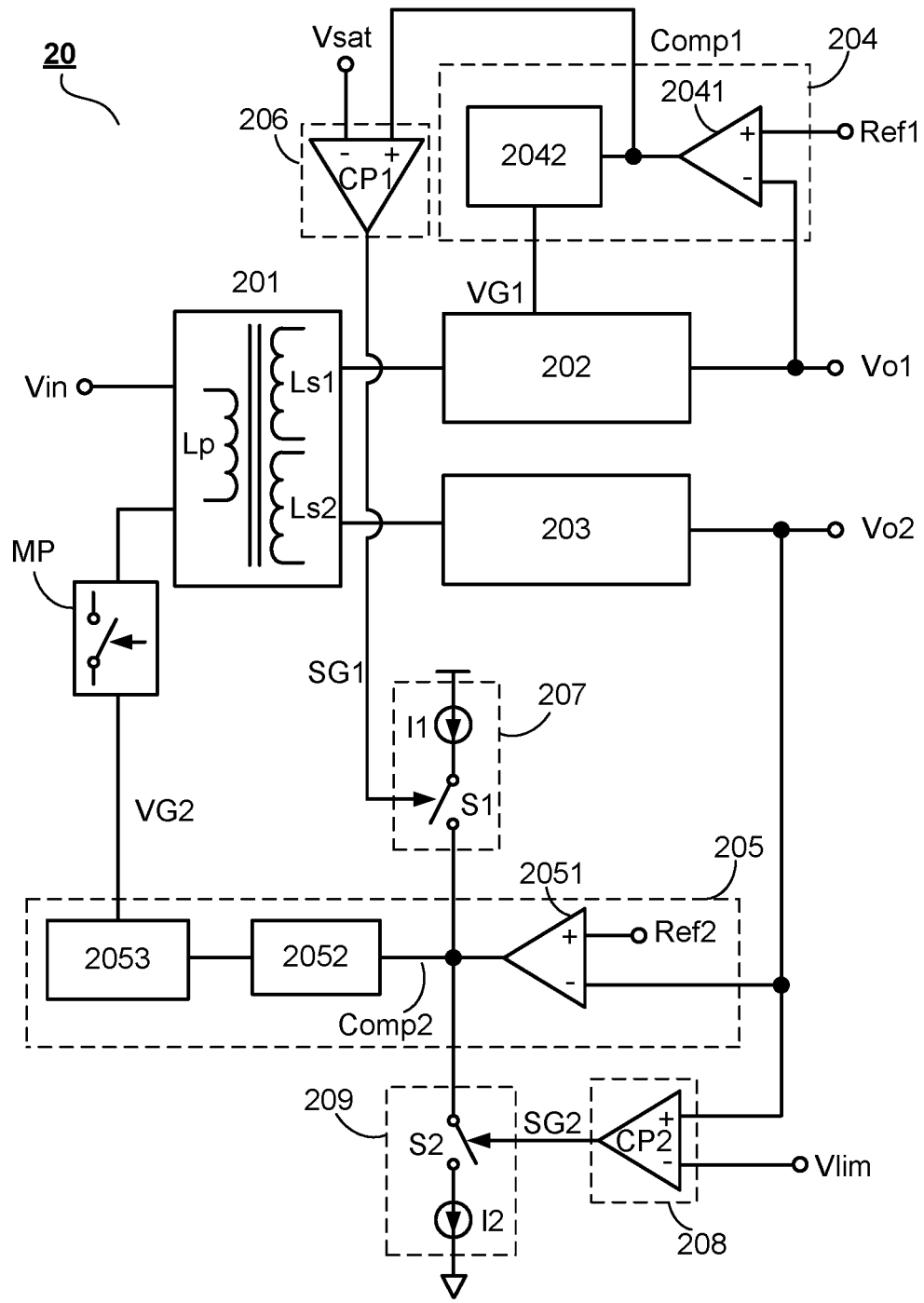
FIG. 2 schematically shows a power converter 20 with multiple outputs in accordance with an embodiment of the present invention.

FIG. 2 schematically shows a power converter 20 with multiple outputs in accordance with an embodiment of the present invention. As shown in FIG. 2, the power converter 20 comprises: a transformer 201, having a primary winding Lp, a first secondary winding Ls1 and a second secondary winding Ls2; a primary power switch MP, coupled to the primary winding Lp of the transformer 201; a first rectifying circuit 202, coupled to the first secondary winding Ls1, and configured to provide a first output voltage Vo1; a second rectifying circuit 203, coupled to the second secondary winding Ls2, and configured to provide a second output voltage Vo2; a first loop control circuit 204, having a first error amplifier 2041 configured to receive the first output voltage Vo1 and the first reference voltage Ref1, and to provide a first error amplifying signal Comp1; a second loop control circuit 205, having a second error amplifier 2051 configured to receive the second output voltage Vo2 and the second reference voltage Ref2, and to provide a second error amplifying signal Comp2; a saturation detecting circuit 206, configured to receive the first error amplifying signal Comp1 and a saturation reference signal Vsat, and to provide a saturation indicating signal SG1 based on the first error amplifying signal Comp1 and the saturation reference signal Vsat; and a first current source circuit 207, having a control terminal configured to receive the saturation indicating signal SG1, and a charging terminal coupled to an output terminal of the second error amplifier 2051, wherein based on the saturation indicating signal SG1, the first current source circuit 207 charges the output terminal of the second error amplifier 2051.

In FIG. 2, the first rectifying circuit 202 may have the similar structure of the first rectifying circuit 102 shown in FIG. 1, and the second rectifying circuit 203 may have the similar structure of the second rectifying circuit 103 shown in FIG. 1.

In the example of FIG. 2, the first loop control circuit 204 further comprises a first duty cycle control circuit 2042, configured to receive the first error amplifying signal Comp1, and to provide the secondary power switch control signal VG1 based on the first error amplifying signal Comp1. The second loop control circuit 205 further comprises: a second duty cycle control circuit 2053, configured to receive the second error amplifying signal Comp2, and to provide the primary power switch control signal VG2 based on the second error amplifying signal Comp2; and an isolating circuit 2052, configured to provide the second error amplifying signal Comp2 to the second duty cycle regulating circuit 2053. The isolating circuit 2052 comprises devices adopted to isolate the primary side and the secondary side, like opto-coupler. It should be understood that, in the embodiments having the transformer 201 replaced with other non-isolating device (e.g., inductor), the isolating circuit 2052 could be omitted.

The output terminal of the second error amplifier 2051 is coupled to an RC compensation network (not shown in FIG. 2) as prior art error amplifiers do. Thus, when the first current source circuit 207 charges the output terminal of the second error amplifier 2051, the output signal of the second error amplifier 2051, i.e., the second error amplifying signal Comp2 increases, and when the output terminal of the second error amplifier 2051 is discharged, the second error amplifying signal Comp2 decreases.

In one embodiment, to fit the input range of the error amplifier, the output voltages Vo1 and Vo2 are divided before fed back to the error amplifiers. In this circumstance, the first reference voltage Ref1 and the second reference voltage Ref2 should be adjusted accordingly.

In one embodiment, the first current source circuit 207 comprises a constant current source I1 and a switch S1 coupled in series, wherein the switch S1 receives the saturation indicating signal SG1. When the saturation indicating signal SG1 indicates that the first error amplifying signal Comp1 reaches the saturation reference signal Vsat, the switch S1 is turned on, and the constant current source I1 charges the output terminal of the second error amplifier 2051. It should be understood that, the first current source circuit 207 may have other structures. Any circuit that could charge the output terminal of the second error amplifier 2051 with the control of the saturation indicating signal SG1 could be used with the present invention.

In one embodiment, the saturation detecting circuit 206 comprises a comparator CP1. A non-inverting input terminal of the comparator CP1 receives the first error amplifying signal Comp1, an inverting input terminal of the comparator CP1 receives the saturation reference signal Vsat, and the comparator CP1 provides the saturation indicating signal SG1 based on a comparison result of the first error amplifying signal Comp1 and the saturation reference signal Vsat. During when the first error amplifier 2041 is positively saturated, which means the first output voltage Vo1 drops to be much lower than the first reference voltage Ref, a value of the first error amplifying signal Comp1 reaches its highest value, and is higher than a value of the saturation reference signal Vsat. In other situation when the first error amplifier 2041 is not positively saturated, the value of the first error amplifying signal Comp1 is lower than the value of the saturation reference signal Vsat.

When the power converter 20 works in steady state, i.e., the load is constant, the first error amplifying signal Comp1 is lower than the saturation reference signal Vsat, and the saturation indicating signal SG1 keeps the switch S1 off. When the first error amplifier 2041 is positively saturated, the first error amplifying signal Comp1 is higher than the saturation reference signal Vsat, and the comparator CP1 flips. Afterwards, the saturation indicating signal SG1 turns on the switch S1, to let the current source I1 charges the output terminal of the second error amplifier 2051.

The output voltages Vo1 and Vo2 are provided to the post-stage circuits represented by the load RL1 and RL2 respectively as shown in FIG. 1. In one embodiment, when a current of the load RL1 increases, the first output voltage Vo1 decreases, causing the increase of the first error amplifying signal Comp1 When the first error amplifying signal Comp1 increases to the saturation reference signal Vsat, the comparator CP1 flips, and provides the saturation indicating signal SG1 to turn on the switch S1. Then the constant current source I1 charges the output terminal of the second error amplifier 2051, and the second error amplifying signal Comp2 increases. Afterwards, the duty cycle of the primary power switch control signal VG2 provided by the second duty cycle regulating circuit 2053 increases, which means that the on time of the primary power switch MP increases, resulting in the increase of the energy stored in the primary winding Lp, i.e., the energy transferred to the secondary windings and the power provided to the load increase, to meet the load increase requirement.

In the example of FIG. 2, the power converter 20 further comprises: an over voltage detecting circuit 208, configured to receive the second output voltage Vo2 and an over voltage reference signal Vlim, and to provide an over voltage indicating signal SG2 based on a comparison result of the second output voltage Vo2 and the over voltage reference signal Vlim; a second current source circuit 209, having a control terminal configured to receive the over voltage indicating signal SG2, and a discharging terminal coupled to the output terminal of the second error amplifier 2051, wherein based on the over voltage indicating signal SG2, the second current source circuit 209 discharges the output terminal of the second error amplifier 2051.

In one embodiment, the second current source circuit 209 comprises a constant current source I2 and a switch S2 coupled in series as shown in FIG. 2. It should be understood that the second current source circuit 209 may have other structures. Any circuit that could discharge the output terminal of the second error amplifier 2051 with the control of the over voltage indicating signal SG2 could be used with the present invention.

In one embodiment, the over voltage detecting circuit 208 comprises a comparator CP2. In one embodiment, a value of the over voltage reference signal Vlim is larger than the second reference voltage Ref2. When the second rectifying circuit 203 suffers a load change which causes the second output voltage Vo2 increasing to the over voltage reference signal Vlim, the comparator CP2 flips, and the over voltage indicating signal SG2 turns on the switch S2. Then the constant current source I2 discharges the output terminal of the second error amplifier 2051.

In the example of FIG. 2, the first loop control circuit 204, the second loop control circuit 205, the saturation detecting circuit 206, the first current source circuit 207, the over voltage detecting circuit 208 and the second current source circuit 209 form the main part of a control circuit of the power converter 20.

In one embodiment, the first loop control circuit 204, the second loop control circuit 205 except the second duty cycle regulating circuit 2053, the saturation detecting circuit 206, the first current source circuit 207, the over voltage detecting circuit 208 and the second current source circuit 209 are integrated together in a secondary control chip, and the second duty cycle regulating circuit 2053 is integrated in a primary control chip.

In one embodiment, the primary power switch MP is integrated in the primary control chip, and the secondary power switch MS is integrated in the secondary control chip. In one embodiment, the first rectifying circuit 202 and the second rectifying circuit 203 are both integrated in the secondary control chip.

In one embodiment, the first loop regulating circuit 204 and the second loop regulating circuit 205 may comprise conventional control circuit like voltage control circuit or peak current control circuit.

The interaction of the two loops in the power converter in FIG. 1 accelerates the system response to the load change, which grants a better load regulation of the power converter 20.

Figure 3:
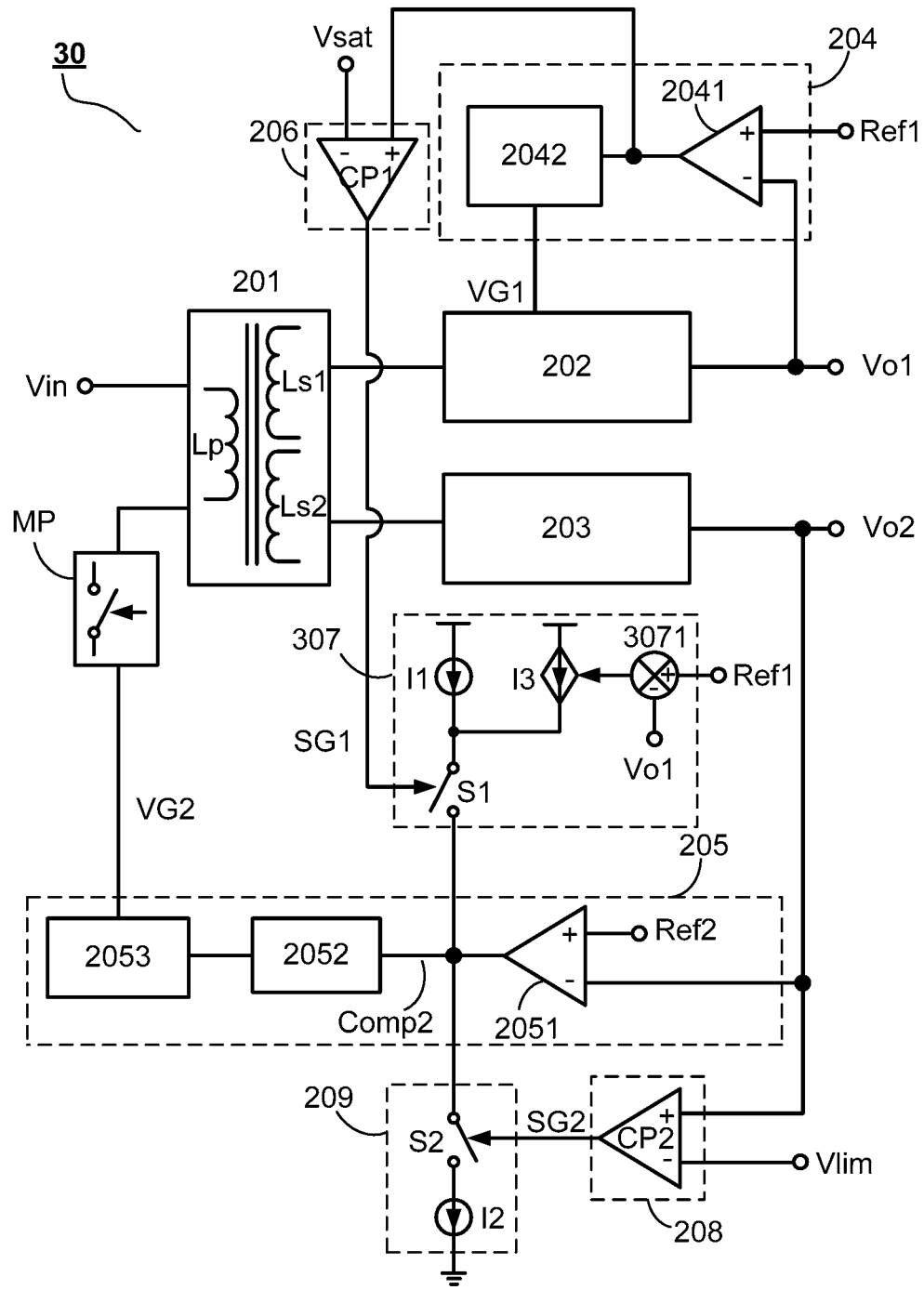
FIG. 3 schematically shows a power converter 30 in accordance with an embodiment of the present invention.

FIG. 3 schematically shows a power converter 30 in accordance with an embodiment of the present invention. Compared with the power converter 20 in FIG. 2, the power converter 30 comprises a first current source circuit 307 having: the constant current source I1 and the switch S1 coupled in series; a differential circuit 3071, configured to receive the first output voltage Vo1 and the first reference voltage Ref1, and to provide a differential voltage Vd indicating a voltage difference between the first output voltage Vo1 and the first reference voltage Ref1; and a controlled current source I3 coupled in parallel with the constant current source I1, wherein the controlled current source I3 has a control terminal configured to receive the differential voltage Vd, and during when the switch S1 is on, the controlled current source I3 charges the output terminal of the second error amplifier 2051 based on the differential voltage Vd.

When the load of the first rectifying circuit 202 increases, the first output voltage Vo1 decreases. As a result, the differential voltage Vd increases. In the embodiment of FIG. 3, a current provided by the controlled current source I3 increases as the differential voltage Vd increases. In a conclusion, the current provided by the controlled current source I3 increases as the first output voltage Vo1 decreases. Thus, the decrease of the first output voltage Vo1 caused by the load increase speeds up the charging process to the output terminal of the second error amplifier 2051, i.e., the increase of the second error amplified signal Comp2 is speeded up, to increase the energy transferred from the primary side to the secondary side, so as to meet the load increase requirement.

Figure 4:
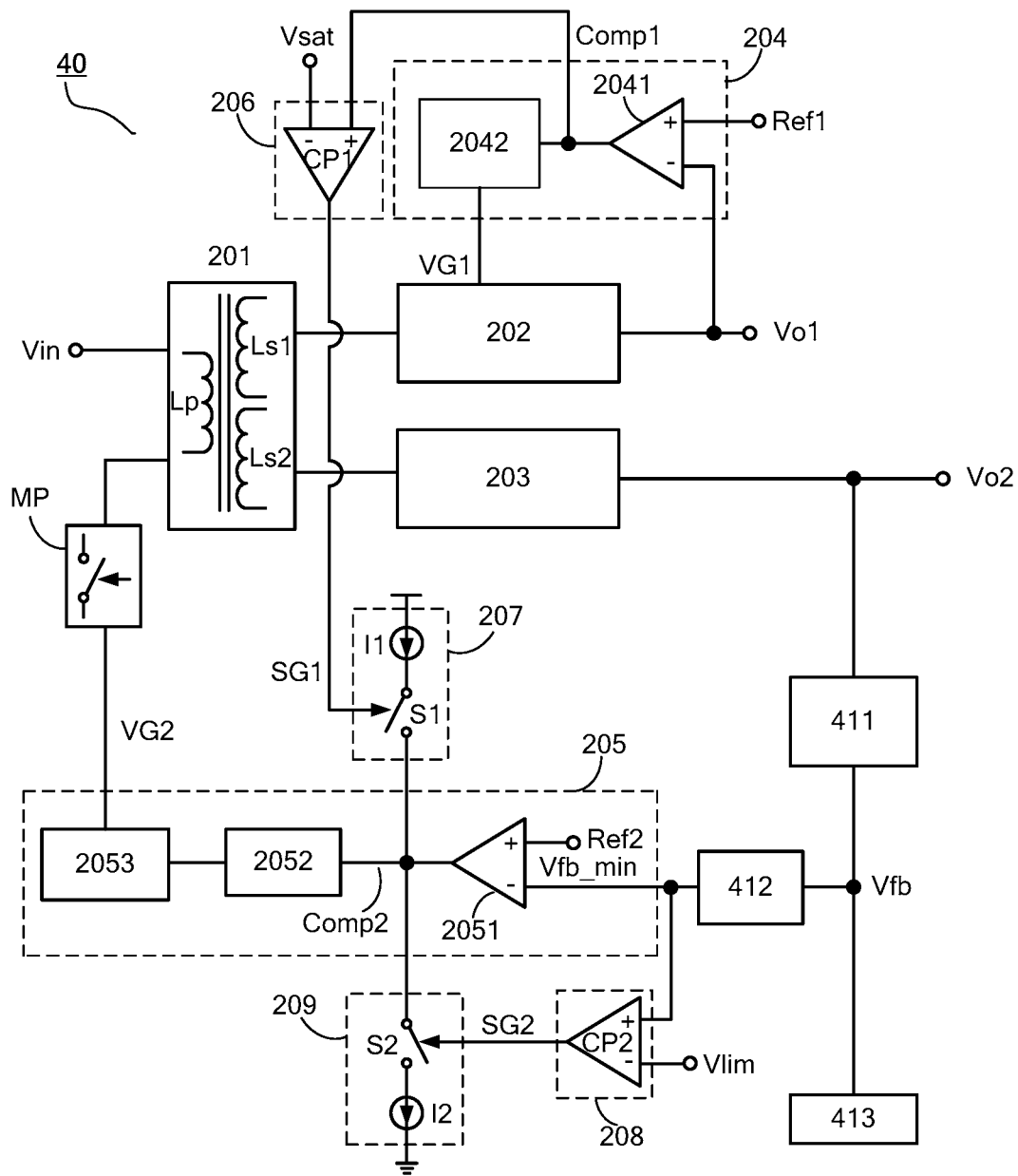
FIG. 4 schematically shows a power converter 40 in accordance with an embodiment of the present invention.

FIG. 4 schematically shows a power converter 40 in accordance with an embodiment of the present invention. Compared with the power converter 20 in FIG. 2, the load RL2 is a plurality of LED strings 411, i.e., the power converter 40 is adopted as a LED driver. The plurality of LED strings 411 is coupled between the second output voltage Vo2 and a current balance circuit 413, wherein a plurality of feedback voltages Vfb associated with the plurality of the LED strings respectively is generated at associated connection nodes of the plurality of LED strings 411 and the current balance circuit 413, and wherein each connection node of a LED string of the plurality of LED strings 411 and the current balance circuit 413 is defined as a feedback terminal of the associated LED string. A minimum feedback voltage Vfb_min of the plurality of feedback voltages Vfb with a lowest value is selected by a minimum value selecting circuit 412, and is fed back to the second loop control circuit 205. The second error amplifier 2051 receives the minimum feedback voltage Vfb_min and the second reference voltage Ref2, and provides the second error amplifying signal Comp2 based on the minimum feedback voltage Vfb_min and the second reference voltage Ref2.

In the embodiment of FIG. 4, the value of the over voltage reference signal Vlim is about 2-3 times of the value of the second reference voltage Ref2. Persons of ordinary skill in the art could choose the value of the over voltage reference signal Vlim according to the application.

In the example of FIG. 4, the first loop control circuit 204, the second loop control circuit 205, the saturation detecting circuit 206, the first current source circuit 207, the over voltage detecting circuit 208, the second current source circuit 209, the minimum value selecting circuit 412 and the current balance circuit 413 form the main part of a control circuit of the power converter 40.

In one embodiment, the first loop control circuit 204, the second loop control circuit 205 except the second duty cycle regulating circuit 2053, the saturation detecting circuit 206, the first current source circuit 207, the over voltage detecting circuit 208, the second current source circuit 209, the minimum value selecting circuit 412 and the current balance circuit 413 are integrated together in a secondary control chip.

Figure 5:
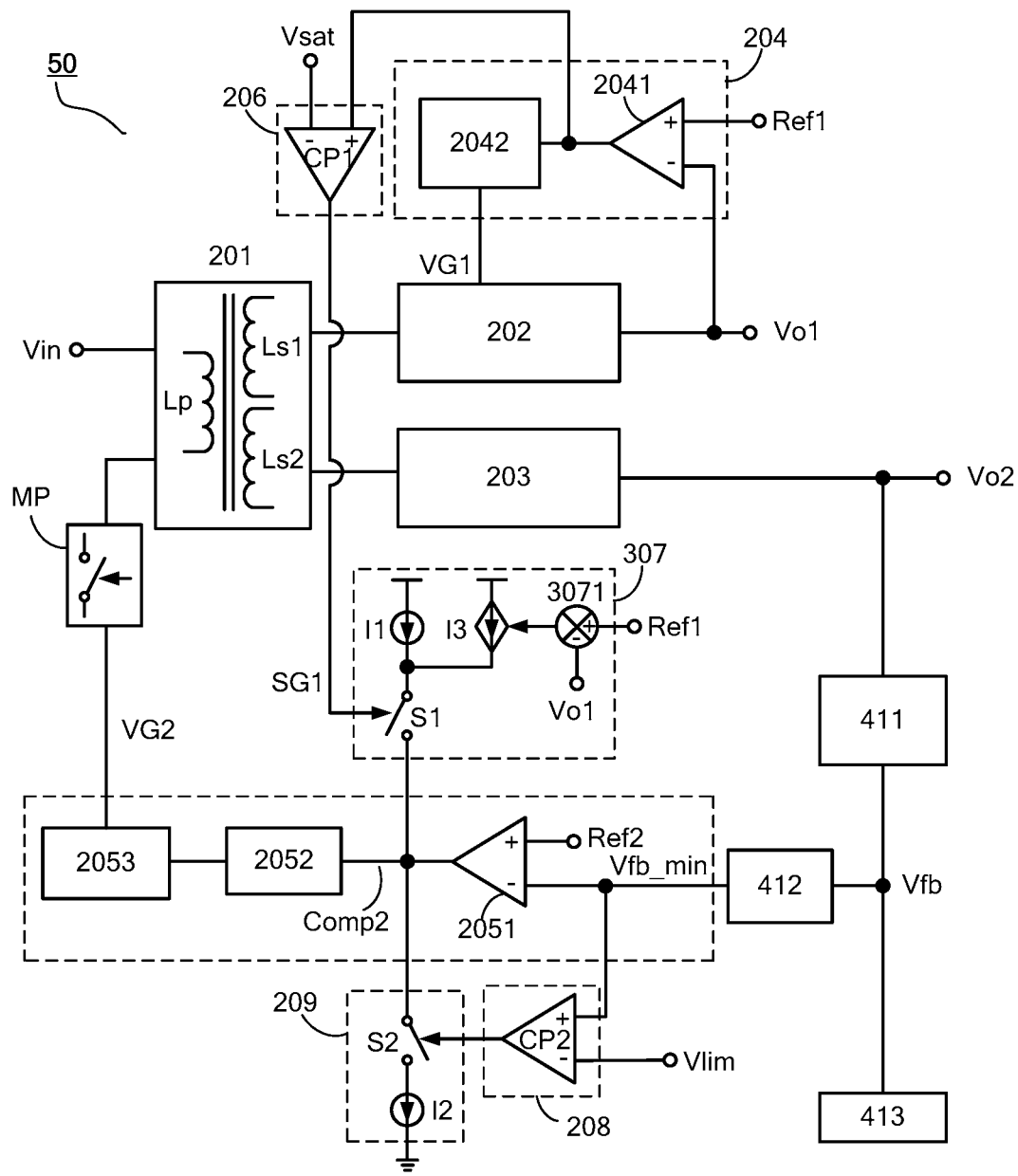
FIG. 5 schematically shows a power converter 50 in accordance with an embodiment of the present invention.

FIG. 5 schematically shows a power converter 50 in accordance with an embodiment of the present invention. Compared with the power converter 40 in FIG. 4, the power converter 50 comprises the first current source circuit 307 having: the constant current source I1 and the switch S1 coupled in series; the differential circuit 3071, configured to receive the first output voltage Vo1 and the first reference voltage Ref1, and to provide the differential voltage Vd indicating a voltage difference between the first output voltage Vo1 and the first reference voltage Ref1; and the controlled current source I3 coupled in parallel with the constant current source I1, wherein the controlled current source I3 has the control terminal configured to receive the differential voltage Vd, and wherein during when the switch S1 is on, the controlled current source I3 charges the output terminal of the second error amplifier 2051 based on the differential voltage Vd. The operation of the power converter 50 is similar with the operation of the power converters 40 and 30, and is not described here for brevity.

Figure 6:
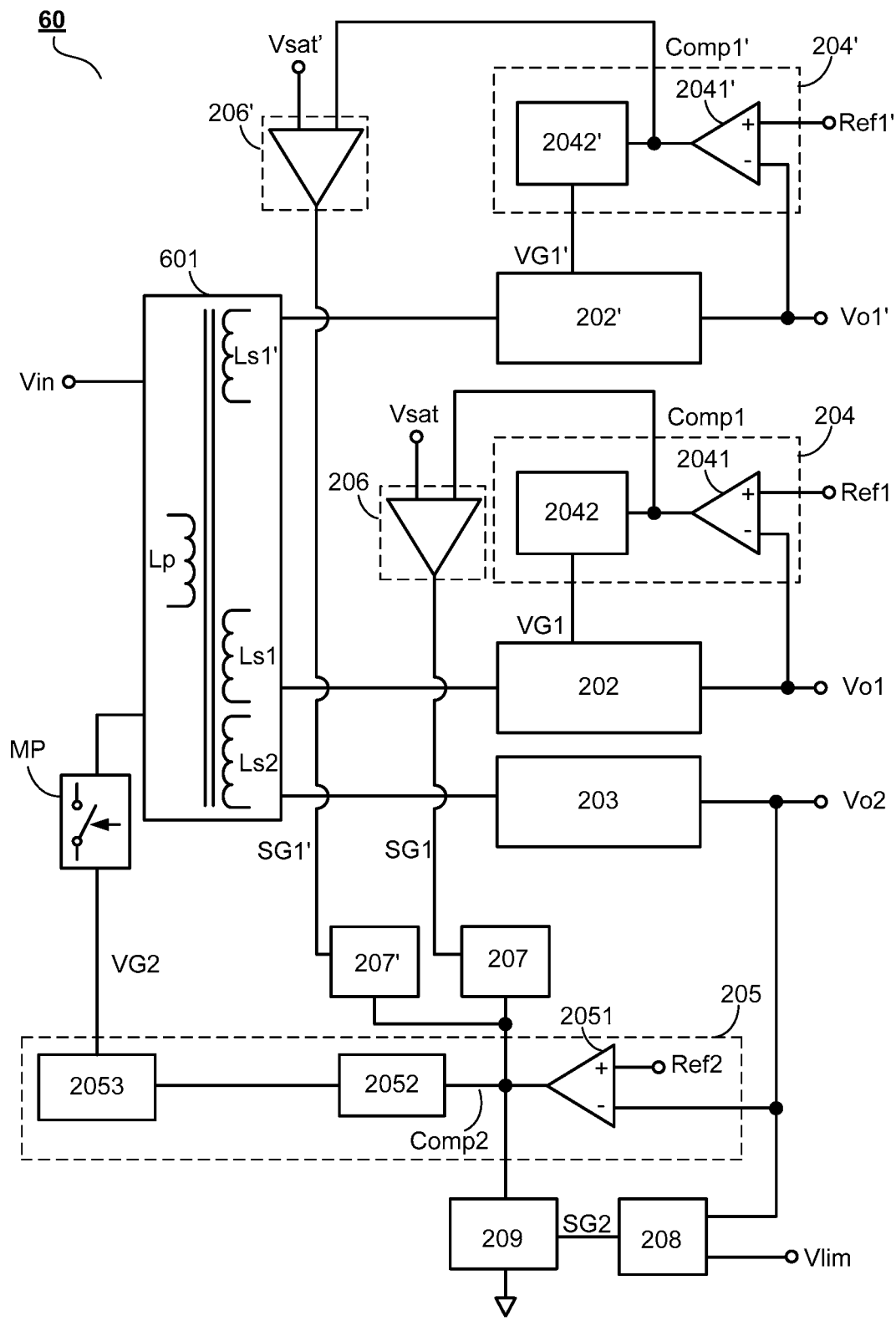
FIG. 6 shows a power converter 60 with three outputs.

For brevity, the present invention is illustrated with the example circuits having two outputs. It should be understood that the present invention could be applied to the power converters having more than two outputs. FIG. 6 shows a power converter 60 with three outputs. Compared with the power converter 20, a control circuit of an extra output terminal providing an output voltage Vo1' has the same structure with the control circuit providing the output voltage Vo1, and also has the similar operation, except for that the power switch control signals VG1' and the power switch control signal VG1 are not overlapped. In the same manner, the power converters 30, 40 and 50 could have more than two outputs too.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit of a power converter, wherein the power converter provides a first output voltage and a second output voltage, the control circuit comprising:
    a first loop control circuit, having a first error amplifier configured to receive the first output voltage and a first reference voltage, and to provide a first error amplifying signal based on a difference between the first output voltage and the first reference voltage;
    a second loop control circuit, having a second error amplifier configured to receive the second output voltage and a second reference voltage, and to provide a second error amplifying signal based on a difference between the second output voltage and the second reference voltage;
    a saturation detecting circuit, configured to receive the first error amplifying signal and a saturation reference signal, and to provide a saturation indicating signal based on a comparison result of the first error amplifying signal and the saturation reference signal; and
    a first current source circuit, having a control terminal configured to receive the saturation indicating signal, and a charging terminal coupled to an output terminal of the second error amplifier, wherein the first current source circuit charges the output terminal of the second error amplifier based on the saturation indicating signal.

2. The control circuit of claim 1, wherein the first loop control circuit further comprises a first duty cycle control circuit, configured to receive the first error amplifying signal, and to provide a secondary power switch control signal to control a secondary power switch of the power converter based on the first error amplifying signal.

3. The control circuit of claim 1, wherein the second loop control circuit further comprises a second duty cycle control circuit, configured to receive the second error amplifying signal, and to provide a primary power switch control signal to control a primary power switch of the power converter based on the second error amplifying signal.

4. The control circuit of claim 3, wherein the second loop control circuit further comprises an isolating circuit, configured to deliver the second error amplifying signal from the second error amplifier to the second duty cycle control circuit.

5. The control circuit of claim 1, wherein the first current source circuit comprises a constant current source and a switch coupled in series, and wherein the switch is controlled by the saturation indicating signal.

6. The control circuit of claim 1, wherein the first current source circuit comprises:
    a constant current source;
    a switch, coupled in series with the constant current source;
    a differential circuit, configured to receive the first output voltage and the first reference voltage, and to provide a differential voltage indicating a voltage difference between the first output voltage and the first reference voltage; and
    a controlled current source, coupled in parallel with the constant current source, wherein the controlled current source has a control terminal configured to receive the differential voltage, and wherein during when the switch is on, the controlled current source charges the output terminal of the second error amplifier based on the differential voltage.

7. The control circuit of claim 1, further comprising:
    an over voltage detecting circuit, configured to receive the second output voltage and an over voltage reference signal, and to provide an over voltage indicating signal based on a comparison result of the second output voltage and the over voltage reference signal; and
    a second current source circuit, having a control terminal configured to receive the over voltage indicating signal, and a discharging terminal coupled to the output terminal of the second error amplifier, wherein the second current source circuit discharges the output terminal of the second error amplifier based on the over voltage indicating signal.

8. A power converter, comprising:
    a first rectifying circuit, configured to provide a first output voltage, wherein the first rectifying circuit has a secondary power switch turned on and off by a secondary power switch control signal to control the first output voltage;
    a second rectifying circuit, configured to provide a second output voltage;
    a first loop control circuit, having a first error amplifier configured to receive the first output voltage and a first reference voltage, and to provide a first error amplifying signal based on the first output voltage and the first reference voltage;
    a second loop control circuit, having a second error amplifier configured to receive the second output voltage and a second reference voltage, and to provide a second error amplifying signal based on the second output voltage and the second reference voltage;
    a saturation detecting circuit, configured to receive the first error amplifying signal and a saturation reference signal, and to provide a saturation indicating signal based on a comparison result of the first error amplifying signal and the saturation reference signal; and
    a first current source circuit, having a control terminal configured to receive the saturation indicating signal, and a charging terminal coupled to an output terminal of the second error amplifier, wherein the first current source circuit charges the output terminal of the second error amplifier based on the saturation indicating signal; wherein the secondary power switch control signal is generated based on the first error amplifying signal.

9. The power converter of claim 8, further comprising a transformer, having winding, a first secondary winding coupled to the first rectifying circuit, and a second secondary winding coupled to the second rectifying circuit.

10. The power converter of claim 9, further comprising:
a primary power switch, coupled to the primary winding, wherein the primary power switch is controlled by a primary power switch control signal generated based on the second error amplifying signal.

11. A control circuit for a LED driver, wherein the LED driver provides a first output voltage and a second output voltage, and wherein the second output voltage is provided to a plurality of LED strings, the control circuit comprising:
a first loop control circuit, having a first error amplifier configured to receive the first output voltage and a first reference voltage, and to provide a first error amplifying signal based on the first output voltage and the first reference voltage;
a current balance circuit, coupled to a feedback terminal of a LED string of the plurality of LED strings, and configured to regulate a current flowing through the LED string of the plurality of LED strings;
a minimum value selecting circuit, coupled to the feedback terminals of the plurality of LED strings to receive a plurality of feedback voltages of the associated LED strings, and configured to provide a feedback voltage with a minimum value;
a second loop control circuit, having a second error amplifier configured to receive the second output voltage and a second reference voltage, and to provide a second error amplifying signal based on the second output voltage and the second reference voltage;
a saturation detecting circuit, configured to receive the first error amplifying signal and a saturation reference signal, and to provide a saturation indicating signal based on the first error amplifying signal and the saturation reference signal; and
a first current source circuit, having a control terminal configured to receive the saturation indicating signal, and a charging terminal coupled to an output terminal of the second error amplifier, wherein the first current source circuit charges the output terminal of the second error amplifier based on the saturation indicating signal.

12. The control circuit of claim 11, wherein the first loop control circuit further comprises a first duty cycle control circuit, configured to receive the first error amplifying signal, and to provide a secondary power switch control signal to control a secondary power switch of the LED driver based on the first error amplifying signal.

13. The control circuit of claim 12, wherein the second loop control circuit further comprises a second duty cycle control circuit, configured to receive the second error amplifying signal, and to provide a primary power switch control signal to control a primary power switch of the LED driver based on the second error amplifying signal.

14. The control circuit of claim 12, wherein the second loop control circuit further comprises an isolating circuit, configured to deliver the second error amplifying signal from the second error amplifier to the second duty cycle control circuit.

15. The control circuit of claim 12, wherein the first current source circuit comprises a constant current source and a switch coupled in series, and wherein the switch is controlled by the saturation indicating signal.

16. The control circuit of claim 12, wherein the first current source circuit comprises:
a constant current source;
a switch coupled in series with the constant current source;
a differential circuit, configured to receive the first output voltage and the first reference voltage, and to provide a differential voltage indicating a voltage difference between the first output voltage and the first reference voltage; and
a controlled current source, coupled in parallel with the constant current source, wherein the controlled current source has a control terminal configured to receive the differential voltage, and wherein during when the switch is on, the controlled current source charges the output terminal of the second error amplifier based on the differential voltage.

17. The control circuit of claim 12, further comprising:
an over voltage detecting circuit, configured to receive the second output voltage and an over voltage reference signal, and to provide an over voltage indicating signal based on a comparison result of the second output voltage and the over voltage reference signal; and
a second current source circuit, having a control terminal configured to receive the over voltage indicating signal, and a discharging terminal coupled to the output terminal of the second error amplifier, wherein the second current source circuit discharges the output terminal of the second error amplifier based on the over voltage indicating signal.

* * * * *